(12) United States Patent
Raby et al.

(10) Patent No.: US 7,553,049 B2
(45) Date of Patent: *Jun. 30, 2009

(54) MOUNTING ARRANGEMENT FOR A REFLECTOR

(76) Inventors: Bruce R. Raby, 354 Paisley Circle, Tecumseh, Ontario (CA) N8N 3R1; Fredrick R. Raby, Sr., 354 Paisley Circle, Tecumseh, Ontario (CA) N8N 3R1

( * ) Notice: Subject to any disclaimer, the term of this patent is extended or adjusted under 35 U.S.C. 154(b) by 166 days.

This patent is subject to a terminal disclaimer.

(21) Appl. No.: 11/287,507

(22) Filed: Nov. 23, 2005

(65) Prior Publication Data

US 2006/0152925 A1    Jul. 13, 2006

Related U.S. Application Data

(63) Continuation-in-part of application No. 10/266,167, filed on Oct. 7, 2002, now Pat. No. 7,018,074.

(60) Provisional application No. 60/631,274, filed on Nov. 24, 2004, provisional application No. 60/694,504, filed on Jun. 27, 2005, provisional application No. 60/697,803, filed on Jul. 8, 2005.

(51) Int. Cl.
*F21V 7/00* (2006.01)

(52) U.S. Cl. ................... 362/306; 362/225; 362/260; 362/341

(58) Field of Classification Search ................. 362/217, 362/219, 225, 260, 296, 306, 341
See application file for complete search history.

(56) References Cited

U.S. PATENT DOCUMENTS

| 5,418,699 | A | * | 5/1995 | Tazawa | 362/255 |
| 5,570,947 | A | * | 11/1996 | Felland | 362/148 |
| 5,988,834 | A | * | 11/1999 | Latzel | 362/320 |

FOREIGN PATENT DOCUMENTS

| DE | 3937256 A1 | * | 5/1991 |
| JP | 06181001 A | * | 6/1994 |

* cited by examiner

*Primary Examiner*—Sandra O'Shea
*Assistant Examiner*—Jason Moon Han
(74) *Attorney, Agent, or Firm*—John R. Benefiel

(57) ABSTRACT

A support arrangement is combined with a reflector sheet and fluorescent light tube to hold the reflector sheet above the tube in a curved trough shape maximum concentration of light at a desired distance from the light tube by varying the curvature in which the reflector sheet is held. An annular piece is detachable to form a larger opening to be fit to a larger tube, while an auxiliary strip can be mounted across the opening to create an opening for a smaller sized opening. The reflector sheet can be held in a reverse bent along its center to avoid light by the tube itself. Two clips can be mounted together at an adjustable distance from each other to allow mounting of a double sized reflector sheet over two side by side light tubes.

7 Claims, 6 Drawing Sheets

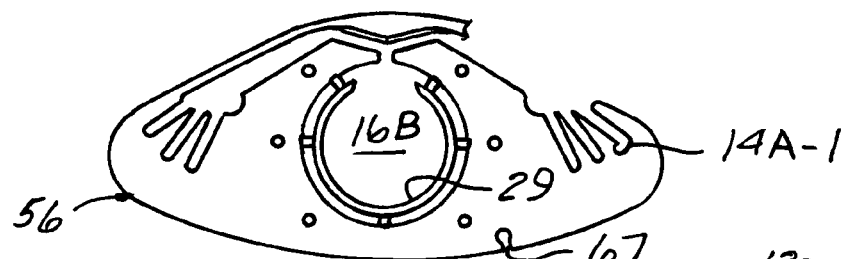
FIG. 5B
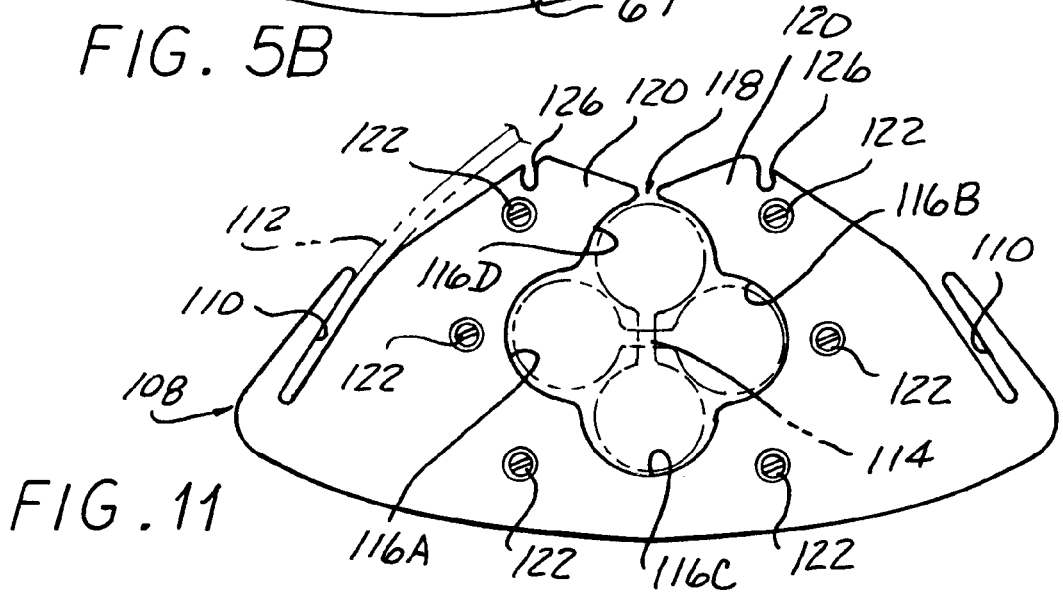
FIG. 11
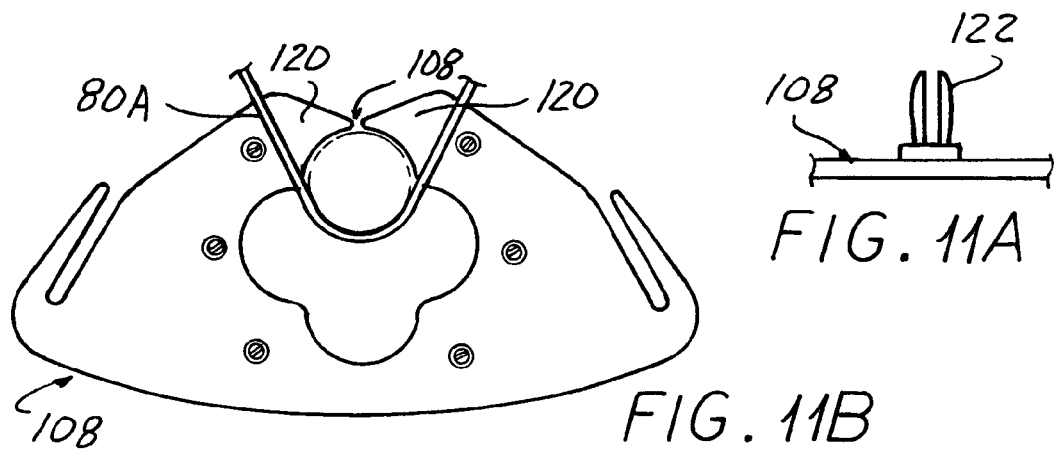
FIG. 11A
FIG. 11B
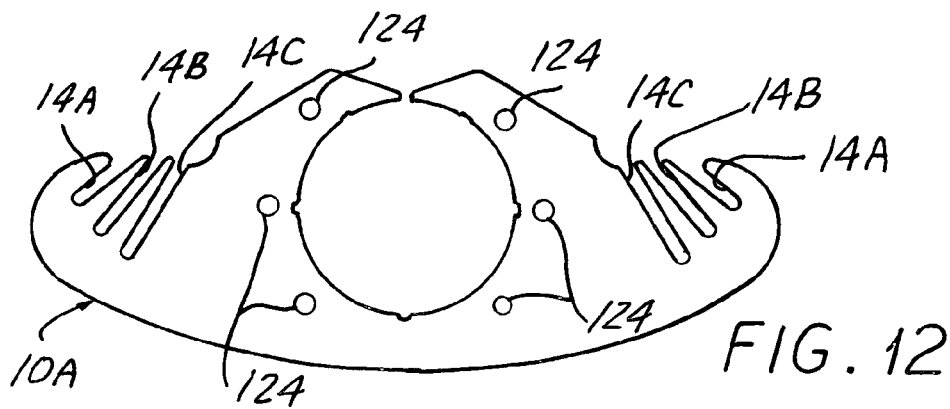
FIG. 12

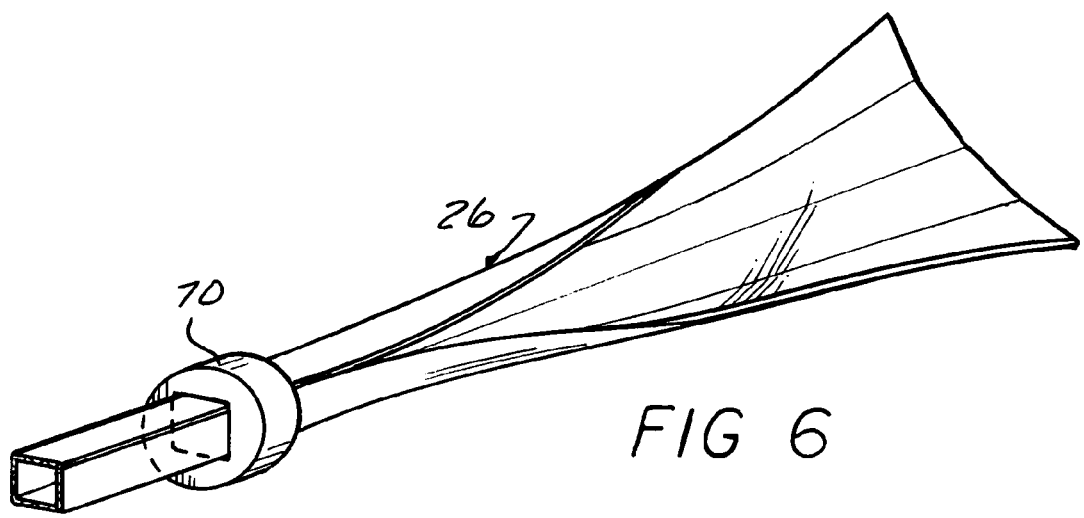
FIG 6
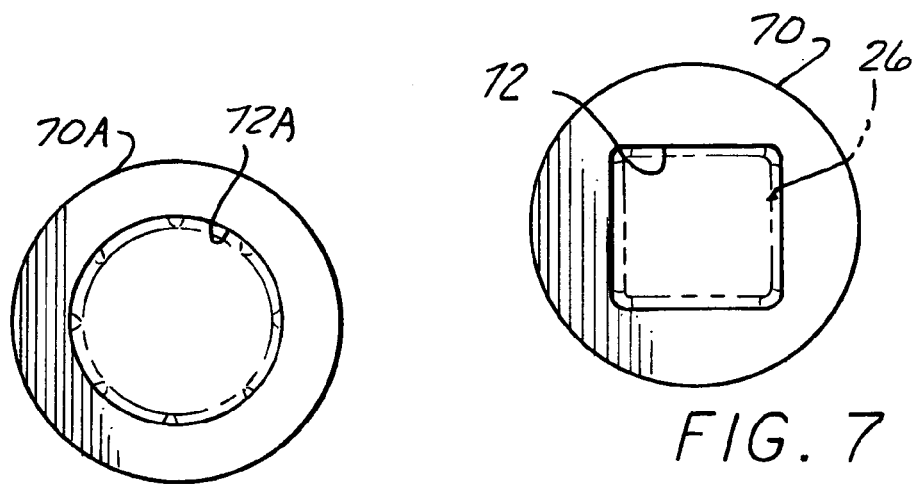
FIG 7A
FIG. 7
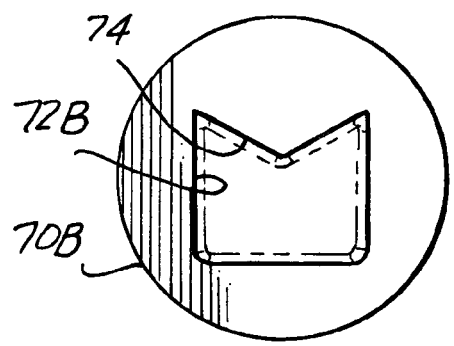
FIG. 7B
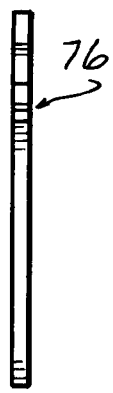
FIG. 8C
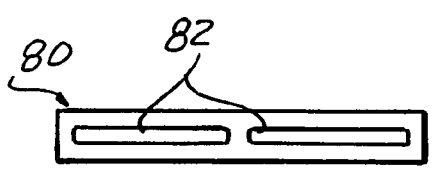
FIG. 8D

MOUNTING ARRANGEMENT FOR A REFLECTOR

CROSS REFERENCE TO RELATED APPLICATIONS

This application is a continuation in part of U.S. Ser. No. 10/266,167 filed on Oct. 7, 2002, now U.S. Pat. No. 7,018,074 B2. The application also claims the benefit of U.S. provisional applications No. 60/631,274, filed on Nov. 24, 2004, and No. 60/694,504, filed on Jun. 27, 2005, and No. 60/697,803, filed on Jul. 8, 2005.

BACKGROUND OF THE INVENTION

This invention concerns improving the light output from fluorescent light fixtures and more particularly reflectors installed on fluorescent tubes. It has heretofore been proposed to improve the efficiency of fluorescent lights by mounting a reflector above the fluorescent light tube or tubes to increase the useful light output generated by the fixture.

In co-pending application Ser. No. 10/266,167, there is described reflector mounting and shaping clips which shapes and mounts a reflector sheet to a fluorescent tube to support the reflector thereon.

It is an object of the present invention to enable clip mounting of reflectors to a greater variety of tube sizes and reflectors.

While any reflector improves the light output, further improvements are believed possible by configuring the reflector in particular ways. That is, the light could be concentrated at a particular working level; and, reflected light normally blocked by the light tube can be recovered.

Therefore, it is a further object of the invention to provide a holder clip creating a shaping of the reflector which produces an enhanced performance of a fluorescent light tube, and to provide a method for improving the shaping of the reflector by the holder clips.

SUMMARY OF THE INVENTION

The above recited objects and other objects which will become apparent upon a reading of the following specification and claims are achieved by a generally flat clip having sets of upwardly convergent slots at either end to allow varying the curvature of the mounted reflector by placing the reflector sheet edges in different slot pairs, creating variable focusing of the light reflected therefrom to maximize the light at a selected distance below the light where the light is most needed.

There is also provided clips which will create a reverse curvature in the center of the reflector sheet in a localized area above the light tube to minimize the blockage of reflected light by the tube itself by causing it to be reflected to either side past the light tube.

The clip is also provided with an additional capability for accommodating different sizes by a slotted strip which can be installed extending across the tube opening, creating a smaller opening suitable for receiving a T-5 tube: The slotted strip is fit into a pair of slots in the clip, which slot can also hold a narrower width reflector. Scallop features can also be formed on either side of the perimeter of the opening or in a knock out portion to accommodate a double light JD-L tube.

A smaller clip is also proved specifically for holding a double light tube and smaller reflector which can be quickly attached to a larger clip to be used with larger reflector sheets. This smaller clip can also be fitted with the auxiliary strip to form a receiving space for a T5 tube.

A pair of bracket segments can be connected together to support a wider reflector extending across both tubes in a double light tube fixture.

DESCRIPTION OF THE DRAWINGS

FIG. 5B is a front view of a modified form of the clip shown in FIG. 5.

FIG. 6 is a pictorial view of a reflector being preformed by a forming collar in preparation for installation of supporting and shaping clips according to the invention.

FIG. 7 is an enlarged end view of the forming collar shown in FIG. 6.

FIG. 7A is an end view of another configuration of the forming collar.

FIG. 7B is an end view of yet another configuration of the forming collar shown in FIG. 6.

FIG. 8C is a side view of the clip shown in FIG. 8.

FIG. 8D is an enlarged plan view of the auxiliary strip shown in FIG. 8.

FIG. 11 is a front view of another embodiment of a clip for a double light tube.

FIG. 11A is a front view of the clip shown in FIG. 11 with an auxiliary strip installed thereon.

FIG. 11B is a fragmentary edge view of a portion of the clip shown in FIG. 11.

FIG. 12 is a front view of a clip shown in FIG. 1 modified to have the clip shown in FIG. 11 attached thereto.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
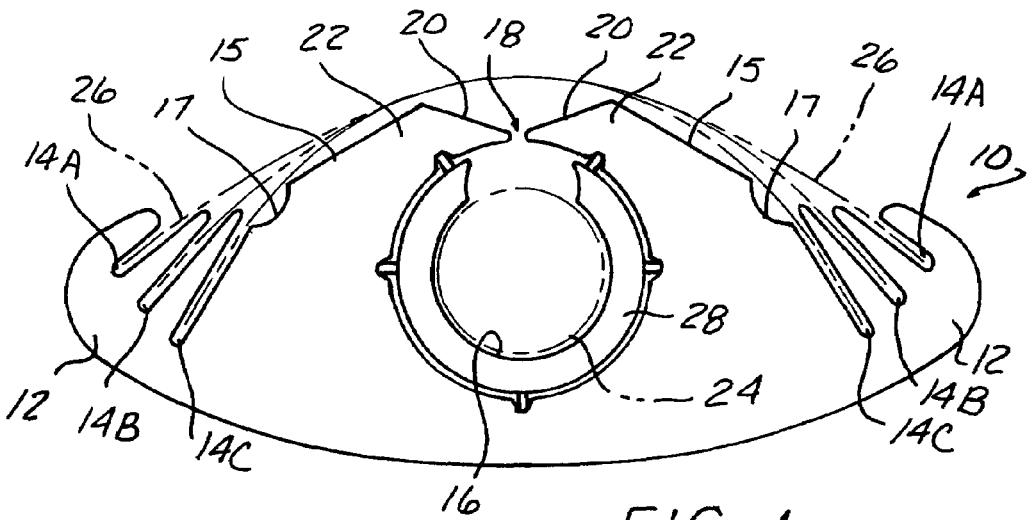
FIG. 1 is a front view of a reflector support clip according to the present invention showing a T-8 tube and reflector sheet installed therein in phantom lines.

Referring to the drawings, FIG. 1 shows a reflector support clip 10 according to the present invention. The clip 10 is comprised of a piece of flat sheet plastic somewhat oblong in shape with a curved lower edge and rounded opposite ends 12. A set of three convergent slots 14A, B, C extend into the upper edge of each end inclined towards the center of the clip 10.

Upwardly sloping contours 15 create an enlarged protuberance at the center of the upper side of the clip 10 within which is formed a round central opening 16, open at the top, and with a central slot 18 lying between downwardly inclined edges 20 extending in from the perimeter edge into the opening 16. The slot 18 allows bending of either or both of the clip portions 22 out of the plane of the drawing to create a larger sized gap to allow a light tube 24 to be passed into the central opening 16. Upon release, the portions 22 snap back to securely capture the tube 24.

One of the slots 14A, B, or C on each end 12 receives one respective opposite edge of a rectangular reflector sheet 26 to cause the reflector sheet 26 to be bent into a curved shape extending partially around the light tube 24. The curvature of the shape tends to focus the light at particular approximate distances from the light tube 24 to maximize the light at that distance. An ability to vary the curvature of the reflector sheet 26 is enabled by insertion in one or the other set of slots 14A, B, or C allows maximum concentration of the light at a particular level beneath the light tube 24. A scallop 17 at the entrance of the innermost slot 14C aids in insertion of the reflector edges.

An annular knock out portion 28 extends partially around the opening 16 connected by small bridging portions to the main part of the clip 10. That is, a T8 will fit inside the hole to the portion. After removal of the annular portion 28, a larger opening 16A (FIGS. 8B and 12J is formed receiving a T-12 tube).

Figure 1C:
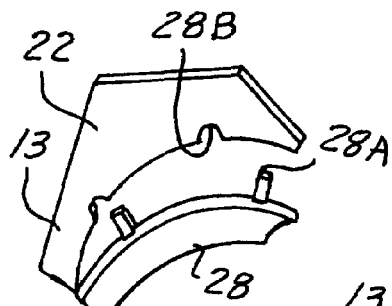
FIG. 1C is an enlarged fragmentary view of the clip shown in FIG. 1 showing the knock out portion being detached.
Figure 1D:
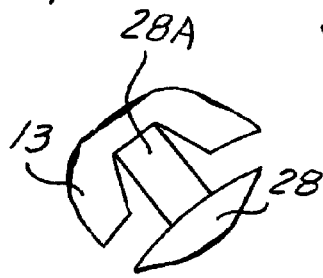
FIG. 1D is a further enlarged front view of a part of the knock out portion connected to the remaining part of the clip.

It is important that no protrusions remain after removal of the knock out portion which would interfere with sliding on the tube 24. For this reason bridging portions 28A are recessed into the clip main part 13 as shown in FIG. 1D. Thus, when broken away as shown in FIG. 1C, recesses 28B are formed insuring no remaining protrusions project therefrom.

Figure 1A:
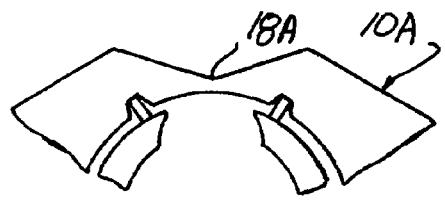
FIG. 1A is a fragmentary front view of a modified form of the clip shown in FIG. 1.

Instead of an open slot 18, a solid bridge 18A (FIG. 1A) can create a complete encirclement. This necessitates installation removal of the light tube 24 by being slid on or off one end of the tube 24.

Figure 1B:
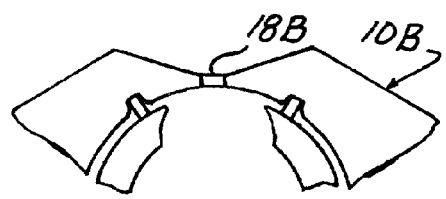
FIG. 1B is a fragmentary front view of another modified form of the clip shown in FIG. 1.

Alternatively, a thin break out portion 18B (FIG. 1B) can be provided to allow a slot 18 to be optionally formed.

The clip 10 as noted is of thin sheet of clear plastic (i.e., 2 mm thick) may be molded from a suitable plastic, such as PROFAX SB891 available from BASELL USA, INC which can be used in injection molding showing good UV resistance and low flammability.

The reflector sheets 26, as described in the co-pending application referenced above, are preferably made from corrugated plastic with a reflective film applied to one side, which film is UV and fire resistant, such as HOSTAPHAN 7UVM film, available from MITSUBISHI POLYESTER FILM.

Suitable corrugated plastic is commercially available which is both fire and UV resistant (2 mm thickness). This provides a lightweight and flexible but strong reflector which does not degrade due to UV radiation nor create a fine hazard.

Figure 2:
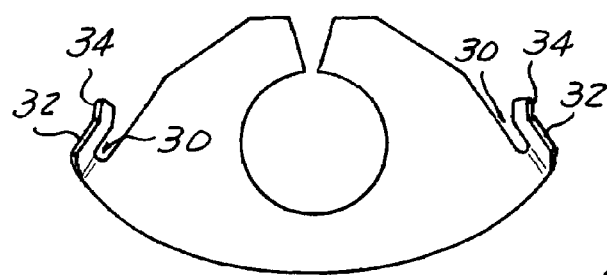
FIG. 2 is a front view of another embodiment of the clip according to the present invention.

FIG. 2 shows an alternate narrower form of the clip 28 which has end slots 30 formed by bent over ears 32 with angled out tips 34. This form of slot 30 allows a more compact clip shape easier to install in narrow fixtures. This slot also allows easier insertion of the edges of reflector sheet.

Figure 3:
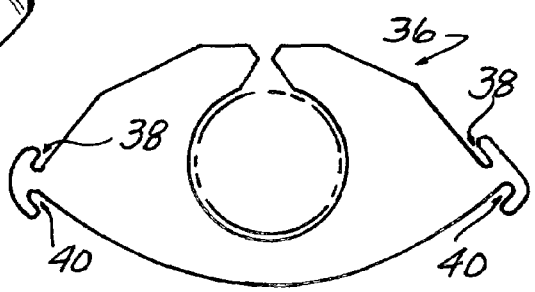
FIG. 3 is a front view of another embodiment of the clip according to the present invention.

FIG. 3 shows a clip 36 having two sets of slots 38, 40 at respective ends thereof to allow a reflector sheet to be installed on the top or bottom of the clip 36 to make installation easier.

The clip 10 has a V-shaped entrance to the slot 18. This is to make the sections 20 narrower to be easier to be twisted away from each other as described above when installing the tube 24.

It has been recognized that the light tube 24 itself will block reflected light. If the reflector sheet 26 in that region behind the tube 24 is bent to be angled away, this otherwise blocked light can be directed out away from the tube 24.

Figure 4:
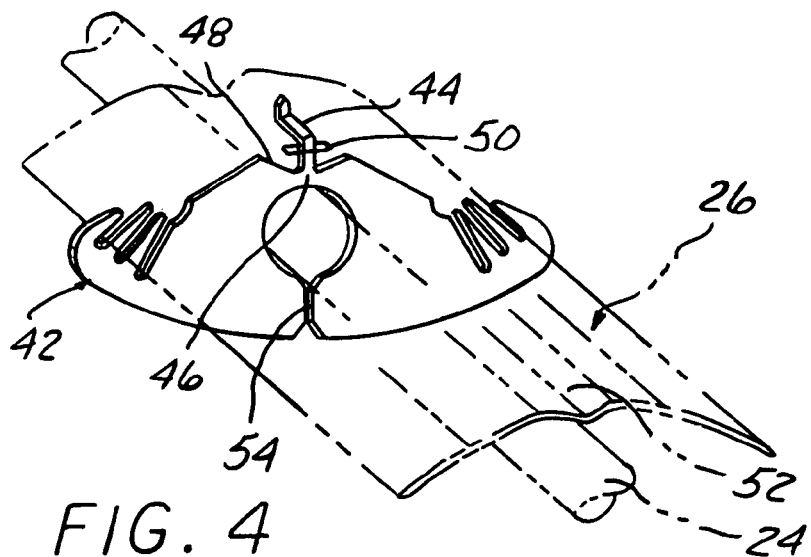
FIG. 4 is a pictorial view of another embodiment of a clip according to the present invention installed on a light tube, the tube and reflector shown in phantom lines and in fragmentary form.

FIG. 4 shows one version of a clip 42 which can accomplish this. A hook 44 is formed at the top of the clip 42 integral with a central bridging portion 46 and the bottom of the V contour 48. In this case, a slot 54 can be added on the bottom side of the clip 42. The hook 44 is inserted in a hole 50 in the center of the reflector 26. This pulls down the center of the reflector 26 to create a localized reverse bending 52 at the center region of the reflector 26.

Figure 5:
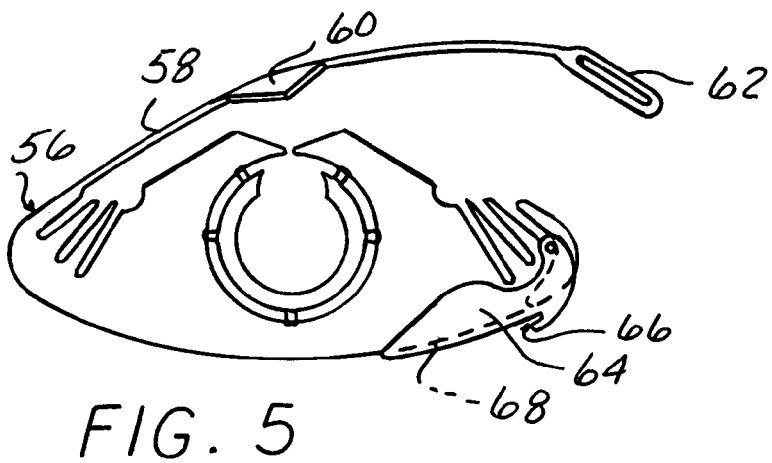
FIG. 5 is a front view of another embodiment of a clip according to the present invention, showing a reverse curvature forming piece and strip in a loosened condition.
Figure 5A:
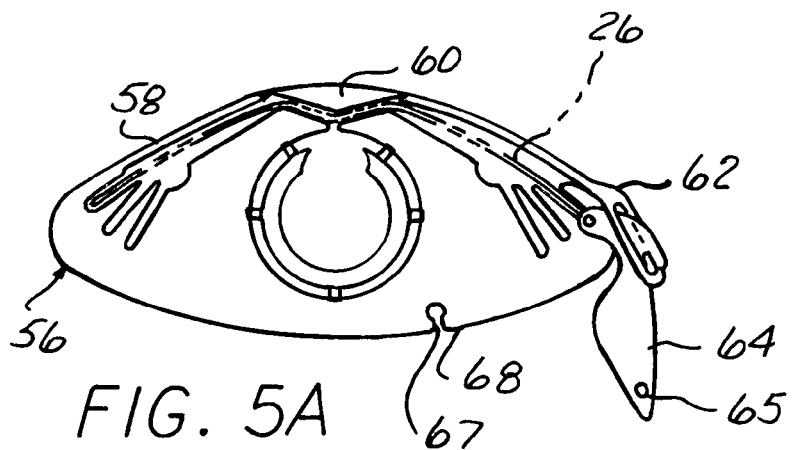
FIG. 5A is a front view of the clip shown in FIG. 5 with the strip forming piece engaging a reflector installed on the clip shown in phantom.

FIGS. 5 and 5A show another clip 56 having a flexible strip 58 integral with one end of the clip 56 extending over the top thereof.

A V-shaped block portion 60 is formed at the center, and a loop 62 at the free end. A lever 64 is pivotally mounted to the other end of the clip 56 with a slot 66 formed into the outside edge. The pivotal mount is created by insertion of a cross pin 57 into an L-shaped outer slot 14A-1 (FIG. 5B).

The loop 62 is hooked thereto with the lever 64 swung up and when the lever is swung down, the strip and block 60 are pulled down, forming a V-shape in the center of the reflector 26. The lever 64 mounts another pin 65 which moves into a slot 67 in the lower edge to be locked in position. The lever 64 is U-shaped to mount pins 57, 65 and to be received over the lower clip edge as seen in FIG. 5A.

A series of clips is contemplated as being used to shape and support a reflector sheet 26. It has been found that in order to create a more uniform trough shape while being held at discrete points by the clips a preshaping of a rectangular reflector sheet is desirable. This is done by sliding a collar 70 along the reflector sheet 26 after folding the one end into a square shape as seen in FIG. 6. The reflector sheet 26 is desirably slit on the backside along spaced apart corrugations, i.e., at spaced intervals of 2 cm or so to aid in forming the same.

The collar 70 has an internal hole 72 matching this square shape. It has been found that this preshaping results in a substantially uniform trough shape when the clips are installed.

FIG. 7A shows a collar 70A having a circular hole 70 formed therein which has also been found to be effective for this purpose.

FIG. 7B shows a collar 70B having a square hole with a V-shape 74 at the top when reverse bending the center region of the reflector sheet 26 is desired.

Figure 8:
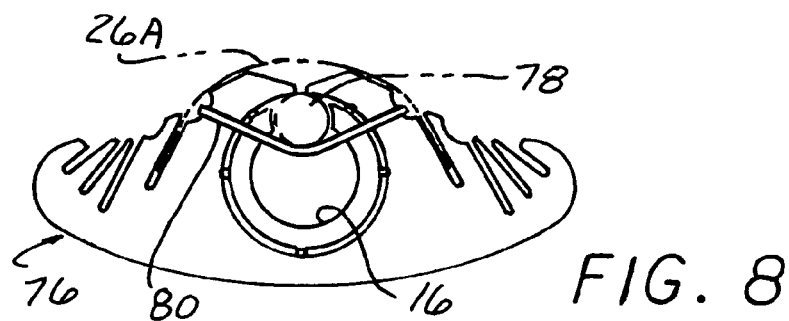
FIG. 8 is a front view of another embodiment of the reflector supporting clip shown with an auxiliary strip installed therein to form a space configured to receive a T5 light tube shown installed therein in phantom lines, with an extra slot for mounting a narrower width reflector also shown in phantom lines.
Figure 8A:
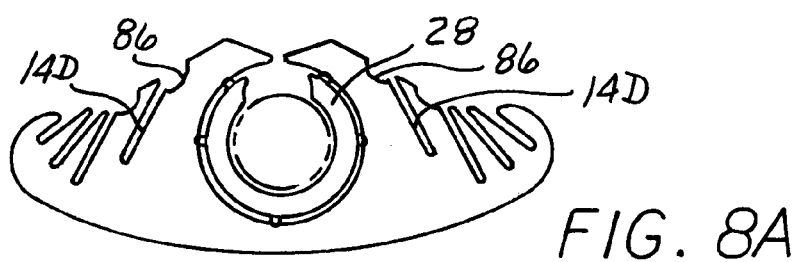
FIG. 8A is a front view of the clip shown in FIG. 8 with the auxiliary strip removed and installed on a T8 light tube shown in phantom lines.
Figure 8B:
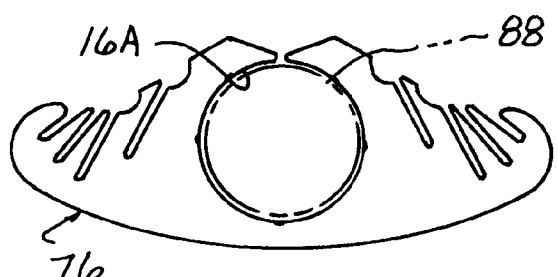
FIG. 8B is a front view of the clip shown in FIG. 8A with a knock out portion removed and a T12 light tube shown installed therein in phantom lines.

FIGS. 8, 8B show a clip 76 which is capable of being mounted to a smaller T5 light tube 78 as well as to mount a narrower (4 inch wide) reflector sheet 26A. An additional slot 14D is provided in either end, closer to the center hole 16. An auxiliary plastic strip 80 has lengthwise slots 82 formed therein at each end (FIG. 8D) the strip slots 82 receiving clip portions 22 allowing the strip 80 to be installed across the opening 16 as seen in FIG. 8, settled in scallop 86 adjacent to the entrance to slots 14D. This forms an upper opening sized to fit a T-5 tube with the strip 80 bent down in the middle.

FIG. 8A shows a T-8 tube installed with the strip 80 removed.

FIG. 8B shows the knock out portion 28 removed to form a larger central opening 16A to allow installation of the clip 76 on a T-12 tube 88.

Figure 9A:
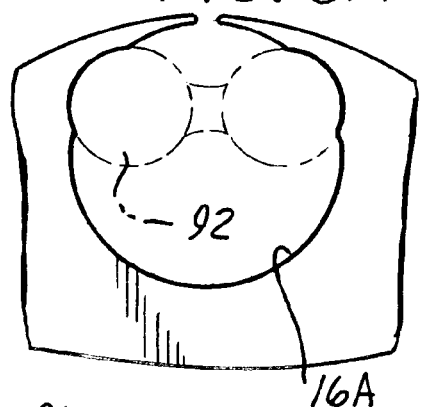
FIG. 9A is a front view of the clip shown in FIG. 9 installed on the double light tube oriented in a horizontal direction.
Figure 9:
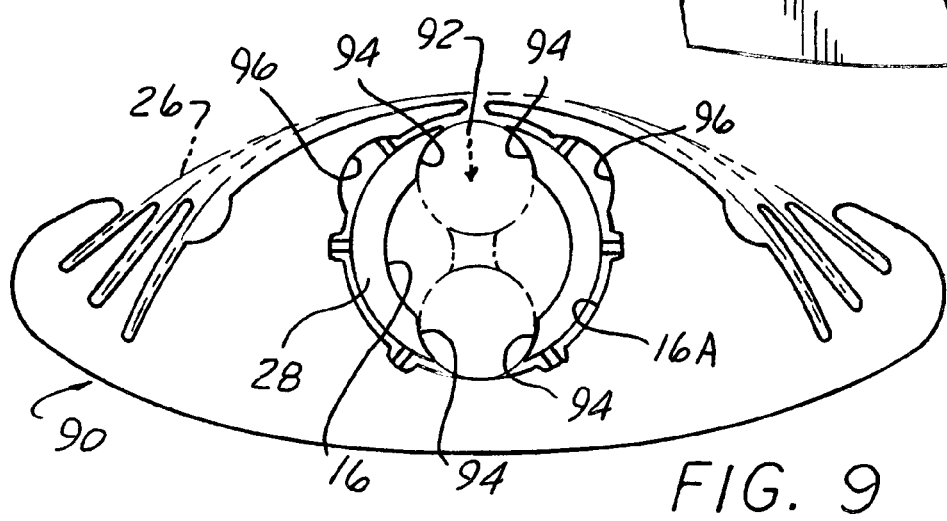
FIG. 9 is a front view of another embodiment of a reflector support clip according to the present invention showing different reflector curvatures shown in phantom lines and a vertically oriented PL-L double light tube on which the clip is installed also shown in phantom lines.

FIG. 5B shows a more slender knockout portion 29 creating a larger central opening 16B for accommodating a T-10 tube Another clip 90 can accommodate a PL-L double tube 92 in either a vertical alignment (FIG. 9) or horizontal arrangement (FIG. 9A).

Pairs of scallops 94 are formed at the top and bottom of opening 16 in the knock out portion 28. This will enlarge the opening 16 at those points sufficiently to accommodate the double tube 92.

A second pair of scallops 96 are located on either side of the top of the opening 16A. With the knockout portion 28 removed, the double tube 92 fits into the scallops 96 when horizontally operated (FIG. 9A).

Figure 10:
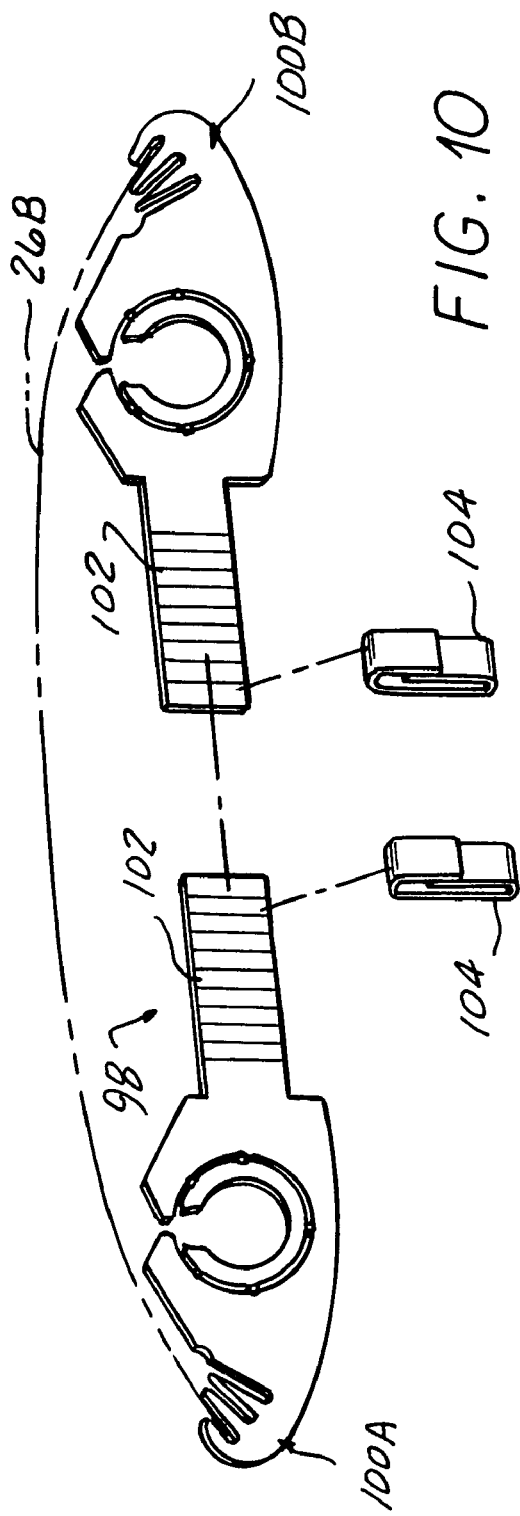
FIG. 10 is an exploded pictorial view of a double clip embodiment of the present invention.
Figure 10A:
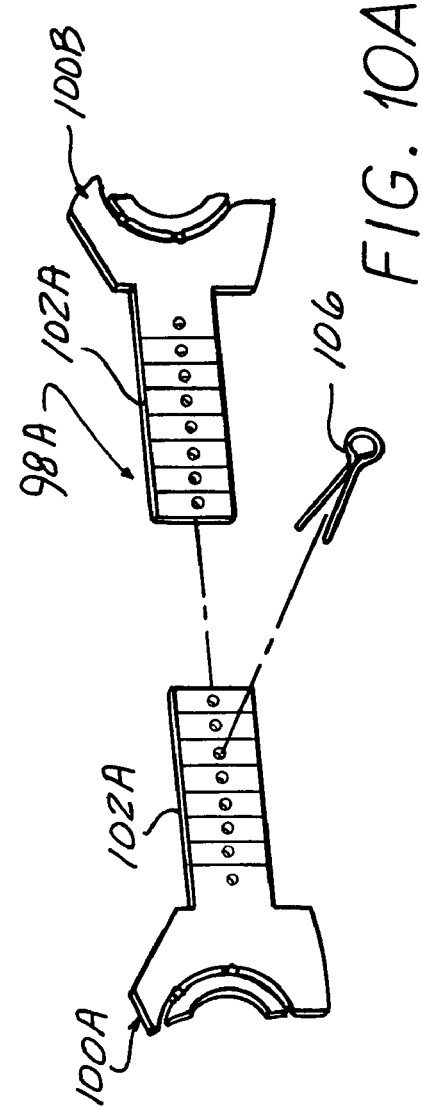
FIG. 10A is a fragmentary exploded pictorial view of another form of the double clip embodiment shown in FIG. 10.

FIG. 10 and 10A show a double clip combination 98 for use in two tube fixtures, in which a pair of clips 100A, 100B are connected together at adjacent ends which have projecting strips 102 which can be lapped together and held in any adjusted position by bands 104. A single double wide reflector 26B is held in slots in the outboard free ends of each clip 100A, 100B. The inner adjacent ends of the clips 100A, 100B are not formed with slots.

The double clip 98 can be installed on pairs of light tubes which may be spaced apart at varying distances due to the adjustability afforded provided by the strips 102.

FIG. 10A shows a variation in which strips 102A each have a series of holes 106 which when aligned receive a connector pin 106 when in an adjusted position.

FIG. 11 shows a small clip 108 specifically designed for a double light tube, with slots 110 upwardly angled towards the center at either end for a narrow reflector sheet 112. A central "cloverleaf" opening 114 is formed by two vertically aligned scallops 116A,B and two horizontally aligned scallops 116D, C. A slot 118 is formed between two bendable opposing portions 120.

A series of split pegs 122 are arranged projecting from one side (FIG. 11F) to enable snap fitter a slightly modified form of the clip 10A (FIG. 12) which has mating holes 124 formed therein. This allows use of the clip 108 with wider reflector sheets in the slots 14A,B,C.

FIG. 11B shows an auxiliary slotted strip 80A of flexible plastic installed over parts 120 and seated in short slots 126 at the top of the clip 108. The strip 80A is therby bent into a rounded shape at the middle together with scallop 116D, forming a T-5 accommodating space.

The invention claimed is:

1. A mounting arrangement for a flexible reflector sheet in combination with a fluorescent light tube comprising a clip, said clip being a generally flat sheet having opposite end portions, each of said end portions having a plurality of slots extending into an outer edge of said clip sheet; said clip sheet having a central opening configured to slidably receive said light tube; wherein said reflector sheet having opposite side edges receivable in a selective pair of said slots which bend said reflector sheet into a curved shape, forming different curvatures of said reflector depending on the particular slots into which said reflector side edges are inserted and thereby allowing varying focal distances of the reflector sheet to be set.

2. The combination according to claim 1 further including a slot extending into said central opening from an outer edge of said clip to allow said light tube to be moved into said central opening through said slot by spreading portions of said sheet clip adjacent said slot apart in a generally axial direction.

3. The combination according to claim 1 wherein said clip is formed with a scallop adjacent an innermost slot to aid in insertion therein of an edge of said reflector sheet.

4. The combination according to claim 1 further including a substantially annular removable piece surrounding said central opening detachable connected to portions of said adjacent an outer perimeter of said annular piece by easily breakable bridging portions allowing removal thereof to form a larger central opening able to accommodate a larger diameter light tube.

5. The combination according to claim 4 wherein said bridging portions extend into a recess in said clip adjacent portions, and are thinner than said clip and said annular piece so as to not leave any part of said bridging portions protruding into said larger central opening upon being broken.

6. A mounting arrangement for a flexible reflector sheet in combination with a fluorescent lamp light tube comprising a flat plastic sheet clip, said sheet clip having opposite end portions, each of said end portions having a plurality of slots, wherein the slots on one end correspond to the slots on the opposite end, each of the slots being angled from each other, said sheet clip having a central opening configured to slidably receive said light tube to be disposed edgewise thereon, said reflector sheet having opposite side edges received in corresponding slots bending said reflector sheet into a curved shape.

7. The combination according to claim 6 further including a slot extending into said central opening from one side of said sheet clip to allow said light tube to be moved into said central opening through said slot by bending either portion adjacent said slot apart in a generally axial direction, and wherein an easily broken bridging portion extends across said slot.

* * * * *